(12) United States Patent
Tiwary et al.

(10) Patent No.: US 12,391,275 B2
(45) Date of Patent: Aug. 19, 2025

(54) EFFICIENT DETECTION OF STRUCTURE AND STATUS OF TRAFFIC LIGHTS

(71) Applicant: MAGNA ELECTRONICS INC., Auburn Hills, MI (US)

(72) Inventors: Kushagra Tiwary, Cambridge, MA (US); Nuno Sucena Almeida, Cambridge, MA (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 118 days.

(21) Appl. No.: 18/560,478

(22) PCT Filed: May 18, 2022

(86) PCT No.: PCT/US2022/072391
§ 371 (c)(1),
(2) Date: Nov. 13, 2023

(87) PCT Pub. No.: WO2022/246412
PCT Pub. Date: Nov. 24, 2022

(65) Prior Publication Data
US 2024/0246564 A1 Jul. 25, 2024

Related U.S. Application Data

(60) Provisional application No. 63/191,414, filed on May 21, 2021.

(51) Int. Cl.
*G06V 20/58* (2022.01)
*B60W 30/18* (2012.01)
(Continued)

(52) U.S. Cl.
CPC .... *B60W 60/001* (2020.02); *B60W 30/18154* (2013.01); *G06V 10/26* (2022.01);
(Continued)

(58) Field of Classification Search
CPC ............. G06V 20/584; G06K 9/00825; G06K 9/00818; G05D 1/0246; H04W 4/40;
(Continued)

(56) References Cited

U.S. PATENT DOCUMENTS

| 5,550,677 A | 8/1996 | Schofield et al. |
| 5,670,935 A | 9/1997 | Schofield et al. |

(Continued)

OTHER PUBLICATIONS

International Search Report and Written Opinion dated Jul. 28, 2022 from corresponding PCT Application No. PCT/US2022/072391, filed May 18, 2022.

*Primary Examiner* — Kenneth J Malkowski
(74) *Attorney, Agent, or Firm* — HONIGMAN LLP (57) ABSTRACT

A vehicular control system includes a camera disposed at a vehicle that captures image data. The system includes an image processor for processing image data captured by the camera. The system, responsive to processing by the image processor of image data captured by the camera, detects a traffic light in front of the vehicle. The detected traffic light includes a plurality of traffic signals and each traffic signal includes a visual indication for controlling traffic. The system, responsive to detecting the traffic light, generates a digitized traffic light data structure that includes (i) a position of the detected traffic light, (ii) an orientation of the detected traffic light, and (iii) at least one attribute of each traffic signal of the traffic light. The vehicular control system, using the digitized traffic light data structure, autonomously controls a feature of the vehicle.

48 Claims, 8 Drawing Sheets

(51) Int. Cl.
*B60W 60/00* (2020.01)
*G06V 10/26* (2022.01)
*G06V 10/82* (2022.01)

(52) U.S. Cl.
CPC ............ *G06V 10/82* (2022.01); *G06V 20/584* (2022.01); *B60W 2420/403* (2013.01); *B60W 2555/20* (2020.02); *B60W 2555/60* (2020.02)

(58) Field of Classification Search
CPC .. G08G 1/09623; G08G 1/123; G08G 1/0968; B60W 30/18154; B60W 2556/50; B60W 2556/25; B60W 50/14
See application file for complete search history.

(56) References Cited

U.S. PATENT DOCUMENTS

| | | | |
|---|---|---|---|
| 5,949,331 | A | 9/1999 | Schofield et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 9,881,501 | B2 | 1/2018 | Weber |
| 10,235,581 | B2 | 3/2019 | Koravadi |
| 10,346,696 | B1 * | 7/2019 | Wendel ................ G06V 20/584 |
| 2012/0288138 | A1 * | 11/2012 | Zeng ................... G08G 1/09623 |
| | | | 382/103 |
| 2018/0307925 | A1 * | 10/2018 | Wisniowski ............. G06T 7/73 |
| 2019/0213428 | A1 * | 7/2019 | Koravadi ............. G06V 20/584 |

\* cited by examiner

EFFICIENT DETECTION OF STRUCTURE AND STATUS OF TRAFFIC LIGHTS

CROSS REFERENCE TO RELATED APPLICATIONS APPLICATION

The present application is a 371 U.S. national stage entry of PCT Application No. PCT/US2022/072391, filed May 18, 2022, which claims the filing benefits of U.S. provisional application Ser. No. 63/191,414, filed May 21, 2021, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A driving assistance system or vision system or imaging system for a vehicle includes a camera disposed at a vehicle equipped with the vehicular vision system and viewing exterior of the vehicle that captures image data. The camera may include a CMOS imaging array with at least one million photosensors arranged in rows and columns. The system includes an electronic control unit (ECU) with electronic circuitry and associated software. The electronic circuitry of the ECU includes an image processor for processing image data captured by the camera. The system, responsive to processing by the image processor of image data captured by the camera, detects a traffic light in front of the vehicle. The detected traffic light includes a plurality of traffic signals and each traffic signal includes a visual indication for controlling traffic. The system, responsive to detecting the traffic light, generates a digitized traffic light data structure that includes (i) a position of the detected traffic light, (ii) an orientation of the detected traffic light, and (iii) at least one attribute of each traffic signal of the traffic light. The vehicular vision system, using the digitized traffic light data structure, autonomously controls a feature of the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
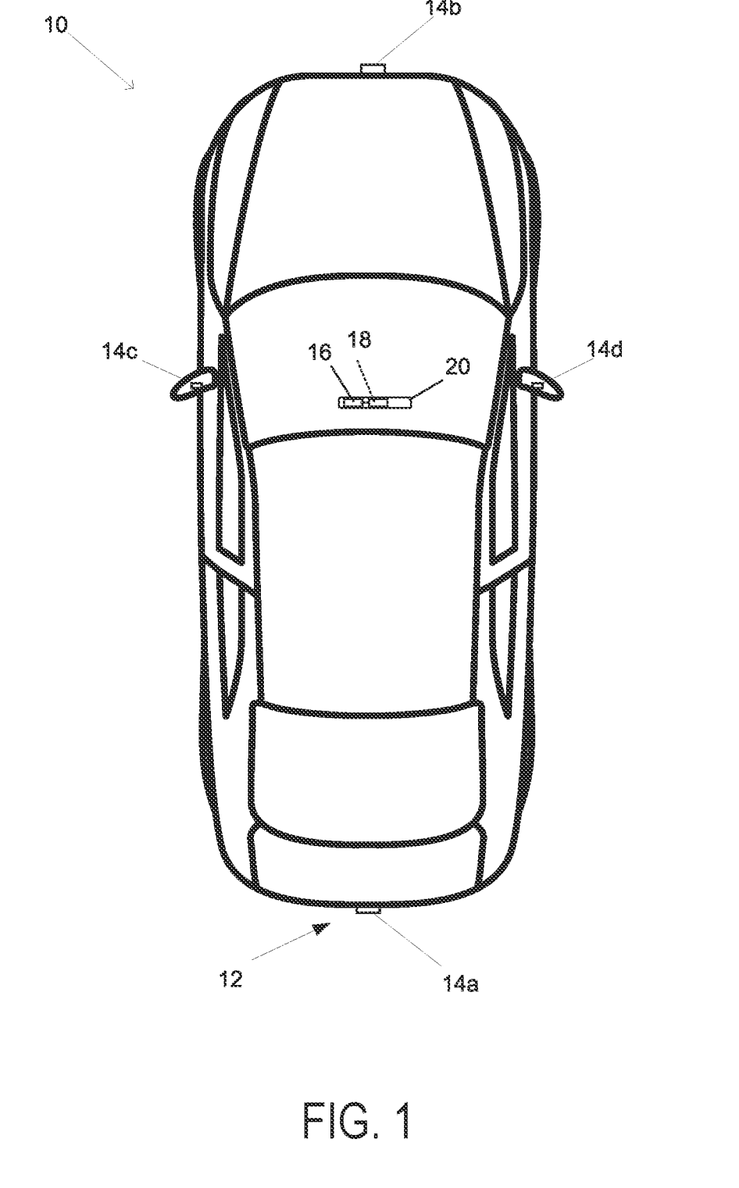
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Traffic light recognition (TLR) is an important task for autonomous vehicles (AVs), and doing so safely, robustly and in an efficient manner while performing other tasks in parallel is imperative. Ideally, a robust TLR system works across all types of traffic lights, such as horizontal/vertical traffic lights, vehicular traffic lights, pedestrian traffic lights, cyclist traffic lights, etc., as well as across colors (red, green, yellow, blue, etc.) and shapes (left, right, straight, angled arrow, solid, etc.). For example, the TLR system determines a traffic signal of a traffic light includes an illuminated arrow permitting traffic on the road being travelled may turn at an intersection. When a new feature task is added to the overall perception component of an AV or semi-autonomous vehicle, the computation load of the system grows, however, the overall system needs to stay within a fixed computational budget.

Implementations herein include a vehicular vision system that incorporates a computationally-efficient method to learn to detect and estimate traffic lights positions and their state from a stream of images for an autonomous or semi-autonomous vehicle, while the system is also engaged in various other perceptual tasks ranging from object detection and image segmentation (e.g., pose estimation, etc.). The system includes deployment of system onto the vehicle in a manner that works with the rest of an autonomy stack. The system allows for two data structures to describe traffic lights. The system may include a common encoder in an encoder-decoder architecture that may scale for many tasks in an efficient manner. The encoder may be the basis for all perceptual tasks such as traffic light detection, object detection, etc. The system may include an iterative method to sample hard examples and new features for continuous improvement of a neural network and optimizations to deploy the neural network onto the vehicle.

Proposed techniques for traffic light detection may be divided into three major methods: model based, learning based, and auxiliary detection. Different techniques may be used to classify a traffic light into a state, and different methods may be used to track it over time. The majority of these techniques rely on color and shape prediction using older non-learning feature extractor methods with blob detection, hue-saturation-value (HSV) Filtering, tracking through Kalman Filter, etc., to reduce false positives. Learning methods may include support vector machines (SVMs) and other detectors such as cascade classifiers, histogram of oriented gradients (HoG), etc. Traffic light/signal detection is currently dominated by model based approaches, especially for finding traffic light candidates. Implementations herein differ from conventional techniques in part at least by implementing a learning based model that, while performing many other tasks simultaneously, detects, classifies, and tracks (temporal) the traffic light state in a computationally-efficient manner.

Implementations herein include a vehicular control system that uses a deep learning approach to detection and state expanded to all kinds of traffic lights such as vehicular, pedestrian, cyclists, trams, colors, and shapes (e.g., left arrow, right arrow, straight, solid, angled arrow etc.). The system detects, classifies, and incorporates temporal information/tracks traffic lights while performing many other tasks simultaneously. Implementations herein use a data driven approach to traffic light detection and state estimation without the need for maps.

A traffic light spotted in a real world intersection is designed for human driving. That is, traffic lights (e.g., stop lights) are designed for humans to be able to easily understand and act on the information provided by the signal. Many traffic lights incorporate several visual clues and are often redundant in nature. This visual information may be defined as traffic light characteristics which may include characteristics such as horizontal/vertical, layout, number of/type of bulbs, and any other attributes that may be encoded in a representation that an AV can understand. Moreover, this information also needs to be perceived, therefore, the information may be encoded into a format from which learning methods such as Deep Neural Networks (DNN) can learn. The representations and data structures for AVs and for learning method are not always compatible. For example, learning methods may require the representation to be in a binary format that is enumerated over all possibilities. The AV representation, however, may be more concise and encode semantic higher-level information.

As used herein, a traffic light refers to any signaling device positioned along roads, at intersections, and other locations to control traffic or flows of traffic. Each traffic light includes one or more traffic signals that visually transmit indications for controlling traffic. For example, a traffic light may include three traffic signals: a green light for signaling that traffic is free to proceed, a yellow light signaling caution, and a red light for signaling that traffic must stop. Traffic signals may include a "bulb" that may include any light-emitting device (e.g., one or more LEDs).

Figure 2:
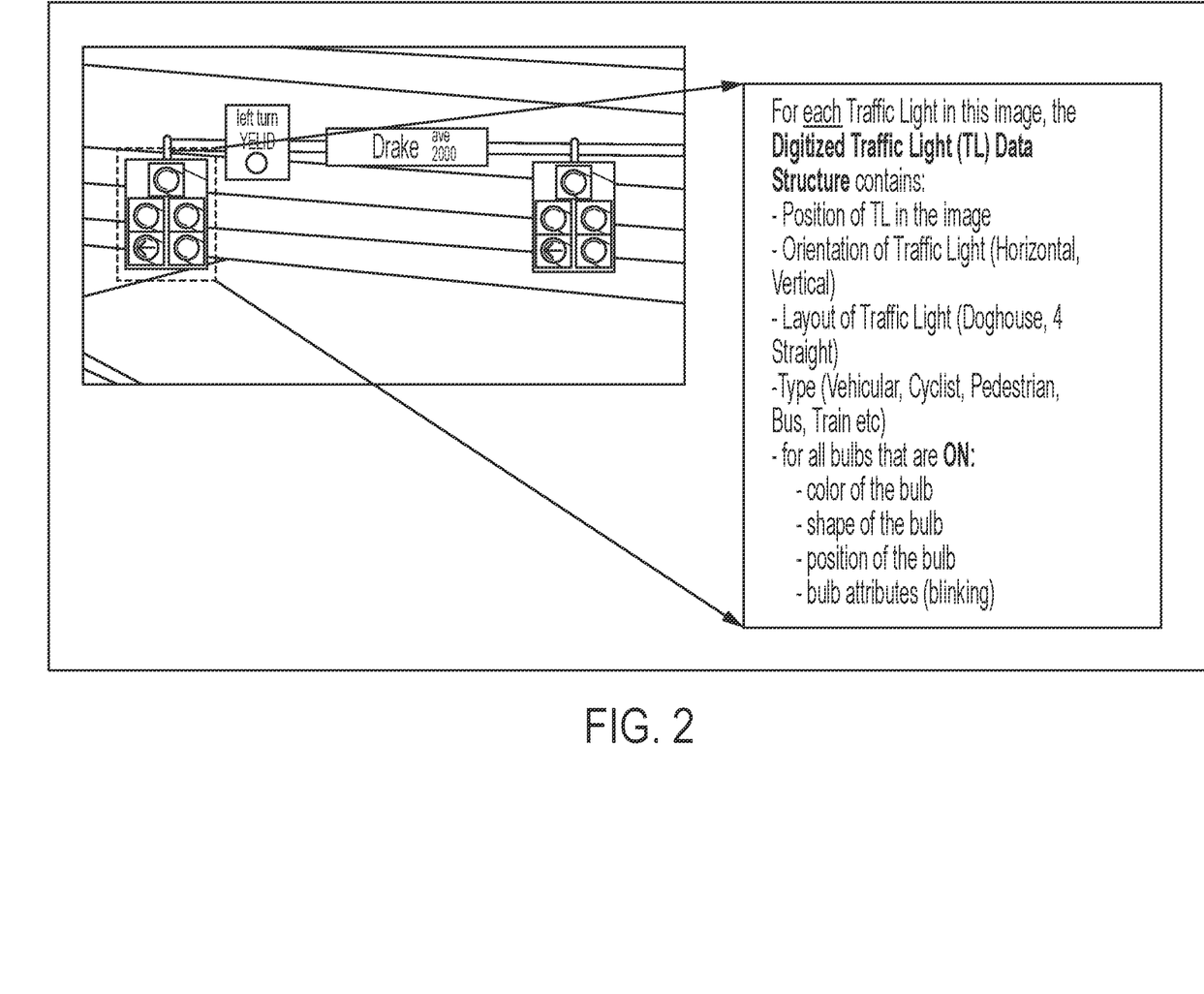
FIG. 2 is a schematic view of a digitized traffic light data structure.

Referring now to FIG. 2, a digitized traffic light data structure is a data structure that represents the position, layout, type and all corresponding attributes of a traffic light in the digital domain. The attributes may include, among other things, a position, one or more colors, a shape, and a status (e.g., blinking or solid) for each bulb or light emitting device in the traffic light. This representation can be utilized for annotation of images, internal storage of data (i.e., storage at non-volatile memory disposed at the vehicle or remote from the vehicle), internal communications among processes, etc. For example, the vehicular control system communicates the digitized traffic data light structure to an autonomous control feature of the vehicle and the autonomous control feature of the vehicle, in response to receiving the digitized traffic data light structure, autonomously controls at least one aspect of the vehicle, such as acceleration of the vehicle, braking of the vehicle, and/or steering of the vehicle.

Figure 3:
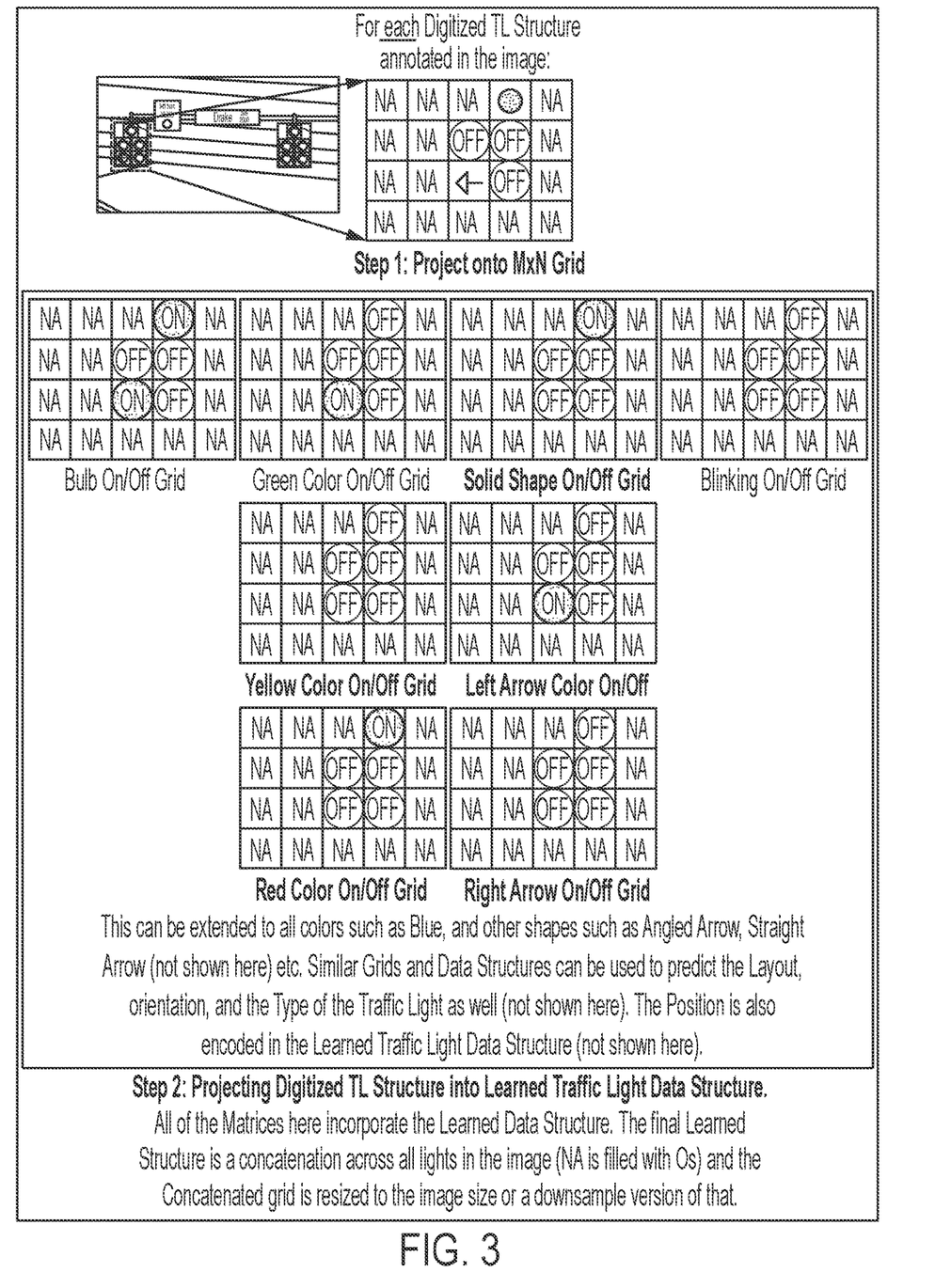
FIG. 3 is a schematic view of a learned traffic light data structure.

The learned traffic light data structure is a representation of the traffic light data structure in a domain that is appropriate for typical neural network architectures. In such a data structure, each traffic light detection is represented by a collection of N-by-M matrices (i.e., two-dimensional matrices), where N is the length and M is the width of such matrix. Specifically, the locations of the entries in the matrix (i.e., each cell of the matrix) correspond to the relative locations of the bulbs in the traffic light. Then, for each attribute other than position, one matrix is generated, which represents the corresponding attribute in the same location for the same bulb in the traffic light (FIG. 3). The system may include an artificial neural network, trained to detect traffic lights, to generate or predict or output one or more such collections of matrices.

Figure 4:
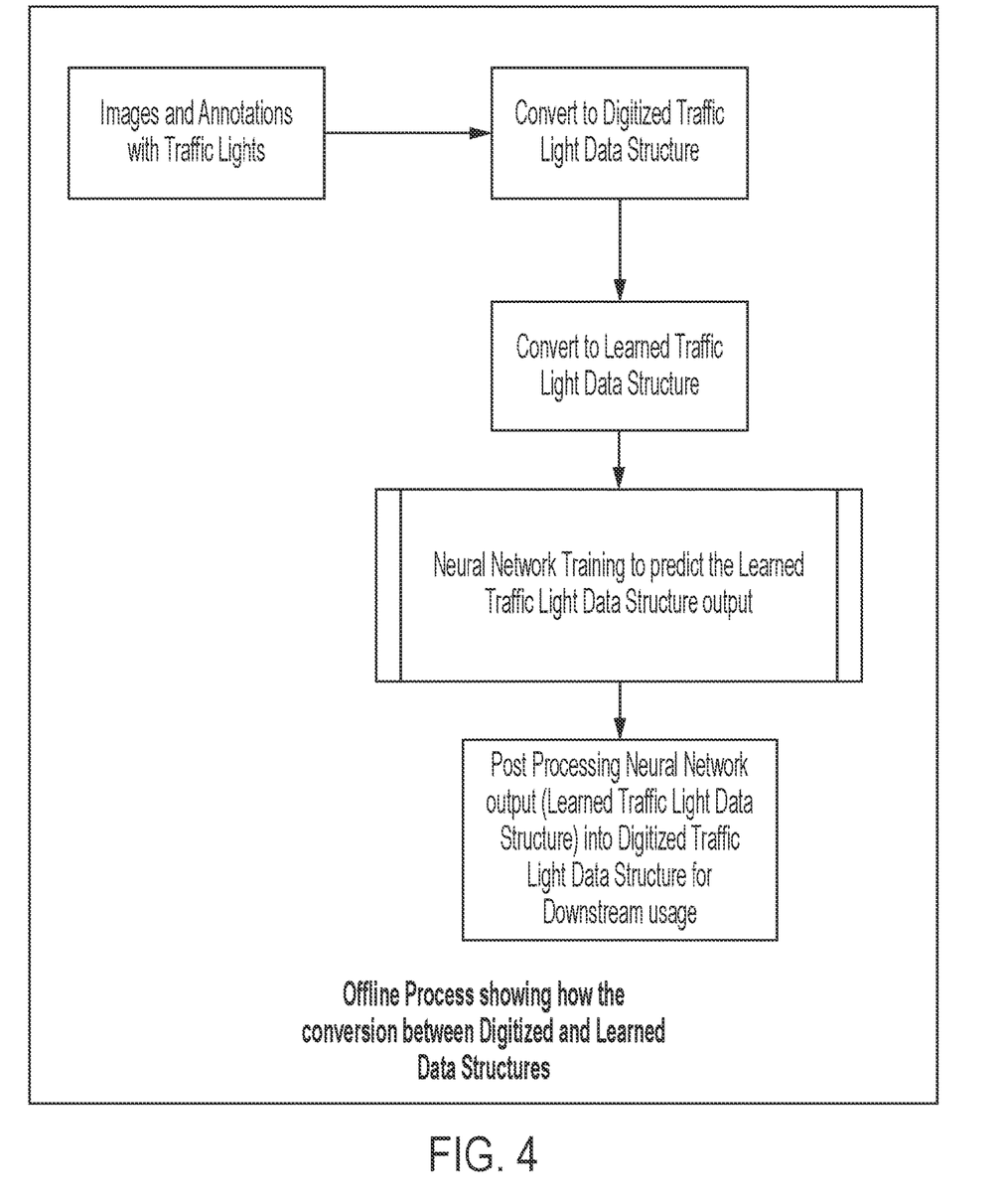
FIG. 4 is a block diagram for converting digitized traffic light data structures and learned traffic light data structures.

While training the traffic light detector neural network, each traffic light label is pre-processed by projecting the position of each bulb (i.e., each light-emitting portion of the traffic light) in the traffic light onto a collection of M-by-N matrices with one such matrix devoted to each attribute other than the position of the bulb. The neural network is thus trained to predict the location of the bulbs in the matrix together with all attributes that correspond to the detected traffic light. The predictions of the neural network are post-processed by constructing the digitized traffic light data structure, which encodes the location of the light in the image, the position of each bulb along with all their attributes (FIG. 4).

The system performs several perceptual tasks simultaneously, such as object detection, image segmentation, etc., multiple times per second in order for the AV to operate safely. Due to the high demands already on the system, it is advantageous for the traffic detection to be computationally efficient. The system may implement an algorithm that incorporates multiple tasks, including traffic light state detection and state estimation, while reducing the computational load in a sublinear fashion. The algorithm for efficient detection is a function of the architecture, along with training processes and inference optimizations.

Optionally, the neural network architecture is an encoder-decoder framework. This includes training a common encoder for multiple tasks. These tasks include, for example, traffic light detection, image segmentation, object detection, and pose estimation, as well as approaches to continuously train and improve the neural network by sampling hard examples from deployment logs. The different task heads (e.g., the traffic light detection task head, an object detection task head, an image segmentation task head, a pose estimation task head, a cuboid detection task head, a weather detection task head, etc.) accomplish these different tasks by utilizing latent representation outputted from the encoder that is common to all such tasks. This framework is commonly referred to as a MultiHead Framework or MultiHead Network Architecture. The encoder neural network is the most resource consuming, which renders the marginal computational cost of traffic light detection small. The architecture (FIG. 5) is described in more detail below.

Figure 5:
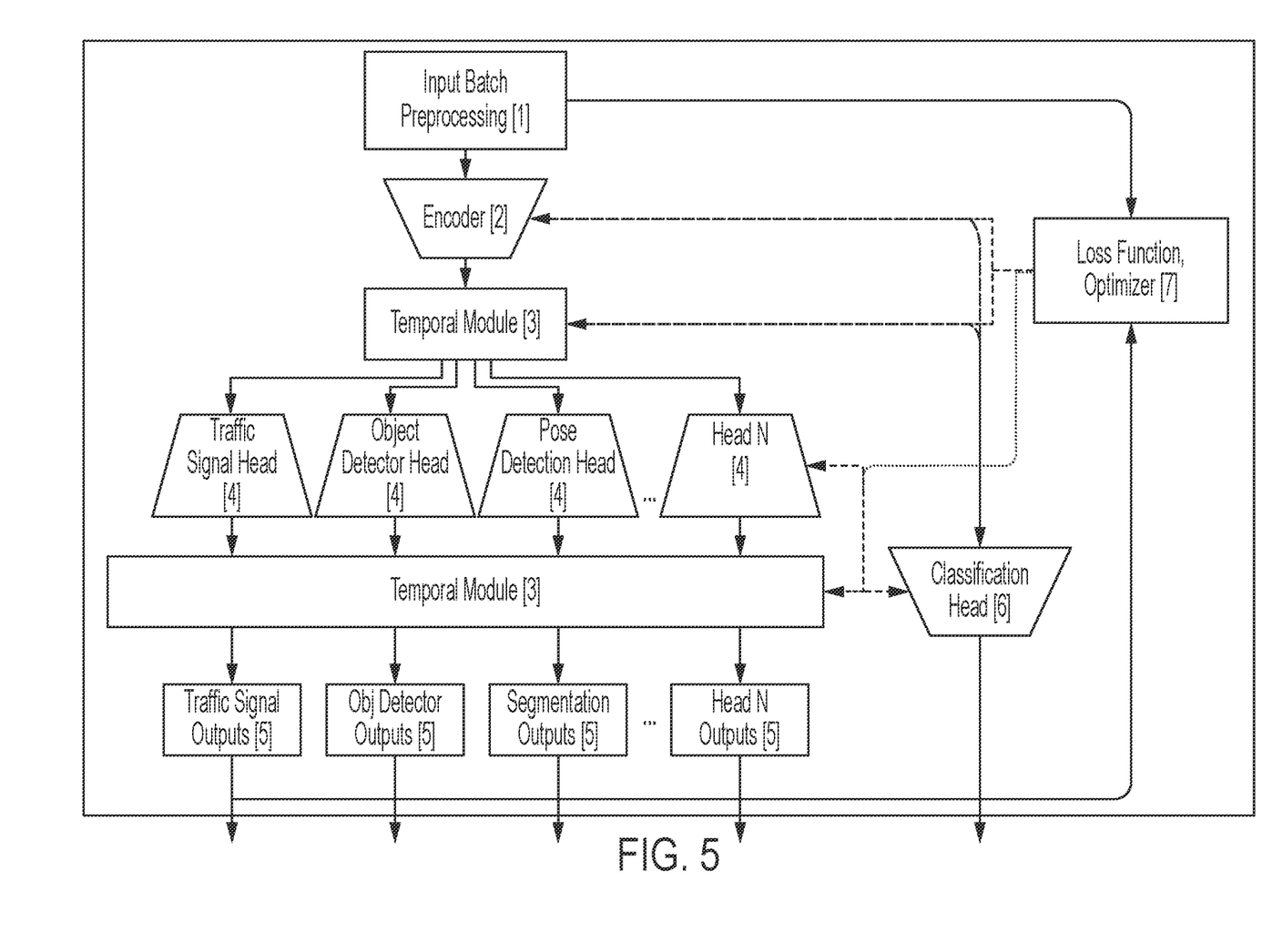
FIG. 5 is a block diagram of an encoder-decoder neural network.

The MultiHead Neural Network Architecture ensures efficient detection by reusing an encoder in an encoder-decoder framework, where the same encoder is utilized for various other detection tasks. Since the encoder network is relatively large in scale, the detection of traffic lights is achieved without excessive additional computational burden, thus allowing the system to incorporate traffic light detection with minimal increase in computational requirements. The common encoder creates a representation of the input image in a latent space. This latent space has features that enable detection of traffic lights and estimation of their corresponding attributes.

The neural network may include input batch processing. As described in more detail below, input batch processing informs loss function optimization. The neural network also includes an encoder network that maps input images or a sequence of images, or other data, from other sensors into a generalized disentangled representation. This representation is referred to as a latent representation space. This space is then consumed by a downstream sub-neural networks for different tasks. The encoder network can be in different sizes depending on the performance requirements.

Optionally, the network includes a temporal module that aggregates features over time to efficiently utilize a sequence of images to extract temporal information for better detection and estimation performance as well as model temporal tasks. The input to the module is a set of features, typically an output from a previous layer or module. The input can be features extracted from a single image or an aggregate set of features from many/previous images. The module aggregates these features by using a concept of memory, and then outputs them in a new representation space that encodes relevant temporal information for downstream prediction. The temporal module works well for features that move consistently over time such as, but not limited to, the movement of pedestrians, vehicles, states of traffic lights, etc.

The output of the temporal module is provided to a task head, which is a lightweight decoder framework that is responsible for, and is trained to, decode task specific features of interest. The MultiTask Neural Network Architecture (FIG. 5) can have many task heads, each trained to predict a specific task including, but not limited to, traffic light detection, object detection, pose estimations, classification of weather in an image, attribute detection, cuboid detection, segmentation, depth, or any combination thereof. The task heads are lightweight by nature, therefore adding a new task does not significantly affect the runtime performance. The network may include any number of task heads simultaneously. Each task heads outputs a trainable heatmap representation that the system uses to calculate and propagate a loss and gradients. Other MultiHead data structures from other task heads (e.g., learned object detectors, cuboid data structures, learned segmentation data structures, learned pose estimation data structures, etc.) may also generate or output a similar trainable heatmap representation.

The traffic light head is the task head employed by the system to output the learned traffic light data structure. Moreover, for the sampling network, the output representation may be extended to include traffic light layout and uncertainty. The output of the task head is a trainable representation of the data that the system uses to calculate, for example, the loss. Additionally, one or more task heads may include smaller heads or sub-heads that are responsible for different sub-outputs necessary for autonomy. For example, the traffic light task head may include sub-outputs that generate outputs representative of a layout, a color and/or a shape of the bulb, a position of the traffic light, a blinking attribute, etc.

For output processing, the learned traffic light data structure is converted into the digitized traffic light data structure that downstream processes can use to enable autonomy. Different networks, such as those for sampling different features (e.g., a specific feature detected by the traffic light detection task head), can output different learned traffic light data structures. For example, the learned traffic light data structure of a particular sampling network may have additional attributes that help sample more images. Similar techniques may be used for other task heads such as learned object detector/cuboid data structure, learned segmentation data structure, learned pose estimation data structure, etc.

The network, in addition to one or more task heads, may include a classification task head that is trained on the entire encoder and temporal representations. The one or more classification task heads are responsible for classifying the entire images for global attributes such as glare, weather, time of day categories, etc. The classification task heads may also be used in the sampling neural network, as they help classify the types of data the network needs to improve on.

The neural network is trained using a loss function optimizer that aggregates and weighs the losses from each task head to compose a final total loss. That is, the loss function optimizer may determine the final total loss based on an aggregation of loss from each of the decoder task heads. The loss operates using each the learned data structure generated by each task head. Since the output of each decoder/task head may or may not be composed of many sub-outputs, loss function optimizer may aggregate those values as well. In addition, the loss function optimizer may conduct multi-task training on the network which includes, for example, joint training on all task heads as a function of the labels in the image, round robin style training on each task head, specific task head updates, training by freezing different parts of the sub network, etc.

The loss function optimizer propagates the gradients to the right neurons, while taking into account the performance of the model/network on a validation training set. The loss for each task head is calculated between the ground truth, and the learned output of each task head. After many iterations of one such training step process, the MultiTask Network converges on each of these tasks.

The process for training the neural network includes data collection and labeling, data augmentation, loss function, and auto-tuning framework. The data collection, labeling and annotation process is summarized in FIG. 6. The process is iterative. The richness of the data set is continuously expanded by deploying the trained network, sampling and labeling the data collected in deployments, and then further training the network. The dataset may be seeded using a manual data collection process. The seed data set is labeled (i.e., with ground truth), which is used for an initial training of the network. Both during the training process and during deployment, sample datasets are identified. The sample datasets may be enhanced with the addition of any other datasets. The resulting sample datasets are labeled and utilized again for further training.

The seed dataset involves driving and collecting, for example, a medium-sized dataset of interesting and/or varied driving interactions which may include (but are not limited to) interesting pedestrian-vehicle interactions, complex signalized intersections, and traffic lights for vehicles, pedestrians, cyclists, trams etc., driving scenarios during different weather conditions, glare, and during different times of day such as dusk, sunset, and night. The seed dataset may include data from a variety of sensors such as cameras, lidar, radar, etc. This seed dataset, after annotation, includes the initial dataset that the deployed and sampling neural networks use for training. The seed dataset may incorporate metadata information for each data point. For example, the metadata includes GPS location data, weather, and time of day.

Given an incoming dataset, the network is trained and passes online constraints prior to deployment on the autonomous vehicle. By using the MultiHead approach to neural networks, the addition of a new head, such as the traffic light head, does not substantially decrease the performance of other already existing heads such as those that perform object detection etc. Therefore, a new feature task can be easily added to the deployment network, without affecting the overall performance. In addition, a much larger "Sampling Network" may also be trained with a different architecture that has higher latency and inference time, but predicts a variety of classes that may be very useful for sampling more data. For example, traffic light layout and image glare classification are useful for sampling hard failure modes.

Deployment of the network includes the training of multiple networks, the evaluation of loss on a validation dataset, and an architecture search to satisfy various performance objectives, such as inference time, latency, and memory utilization. This process is described in further detail below. Deployment of datasets come from operations and also includes data from cameras, lidars, radars and other sensors necessary for autonomous operation. This data contains vital information about how the vehicle reacted in various conditions, including any disengagements, interesting pedestrian-vehicle interactions. The data may also include important traffic light states the vehicle faced while driving. Moreover, this data also includes detection failure states or states lacking temporally consistent detections. The dataset also incorporates metadata information for each data point including, but not limited to, GPS location, weather, and time of day.

The entire sample dataset does not need to be annotated. Many techniques such as using a sampling network, or finding inconsistencies between sampling and deployment networks may be utilized to pinpoint and sample exact new images that will iteratively improve the network performance. Usually, such images and scenarios are unaccounted for in the seed or the current training dataset and therefore are useful to annotate. The sampling process may be done offline over all incoming deployment datasets, and the sampling may be conducted for each of the task heads individually as different images may need different annotations for different task heads. For example, the network can have high performance on the traffic light head, however, poor performance in the pose estimation head. This discrepancy may be detected and the image may be annotated and entered into the training set.

Moreover, the sampling network with extra task and subtask head outputs may be leveraged to sample new and specific traffic light layouts, traffic lights during different time of day and weather, and varying distances to signal. In addition, a combination of both networks on the same set of images may also be used to extract failure cases. For example, this method may be used to automatically detect the discrepancies in state detections between deployed and sampling network outputs. More examples include, but not limited to, finding discrepancies of attribute prediction of the traffic light state between the network itself (e.g., flickering or temporarily inconsistent behavior) or between themselves, or discrepancies between the network output and the mapping component.

For data labeling, frames may be incorporated in an "annotation set" and then sent for annotation. These frames of image data are annotated with a similar annotation scheme as the seed dataset. After annotation, the annotation set (i.e., annotated frames of image data), along with the annotations, is used for training. The process may be repeated until there are no more features to add and the performance of the traffic light head reaches a trustworthy state where downstream processes can use the information to make autonomy decisions at signalized intersections. As the deployments move to a new geographical location, newer traffic light configurations, the process of data collection, sampling, and labeling may be repeated. In the specific case of traffic light detection, the annotation data structure may incorporate all elements needed to create a digitized traffic light data structure.

Figure 6:
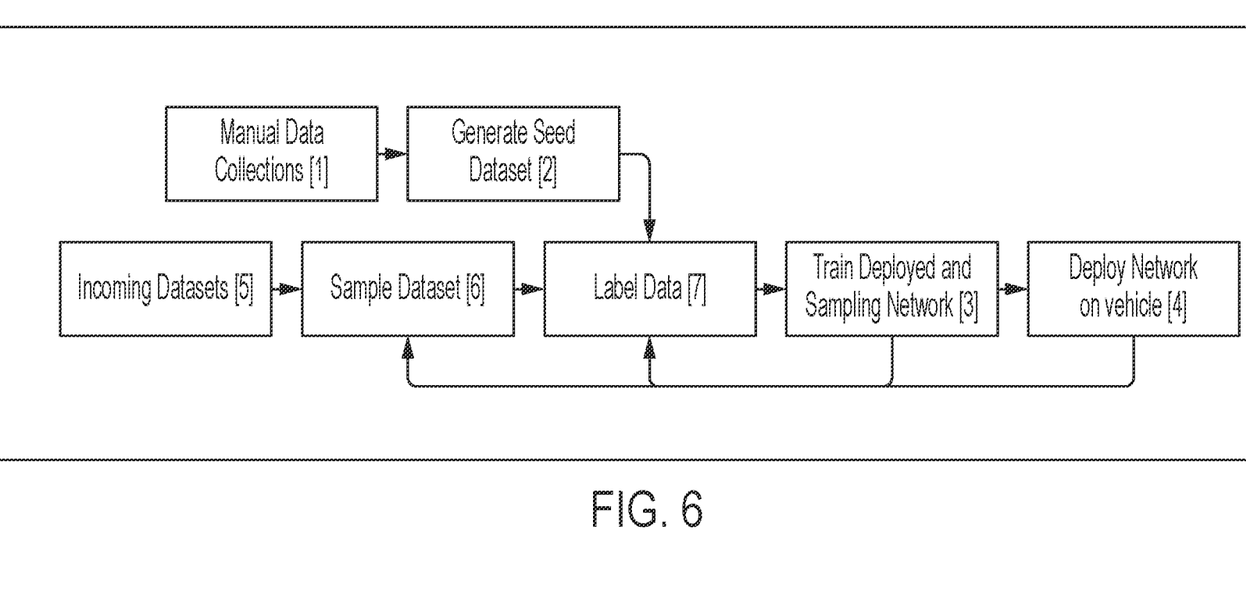
FIG. 6 is a block diagram for data collection, labeling, and annotation of a dataset.
Figure 7:
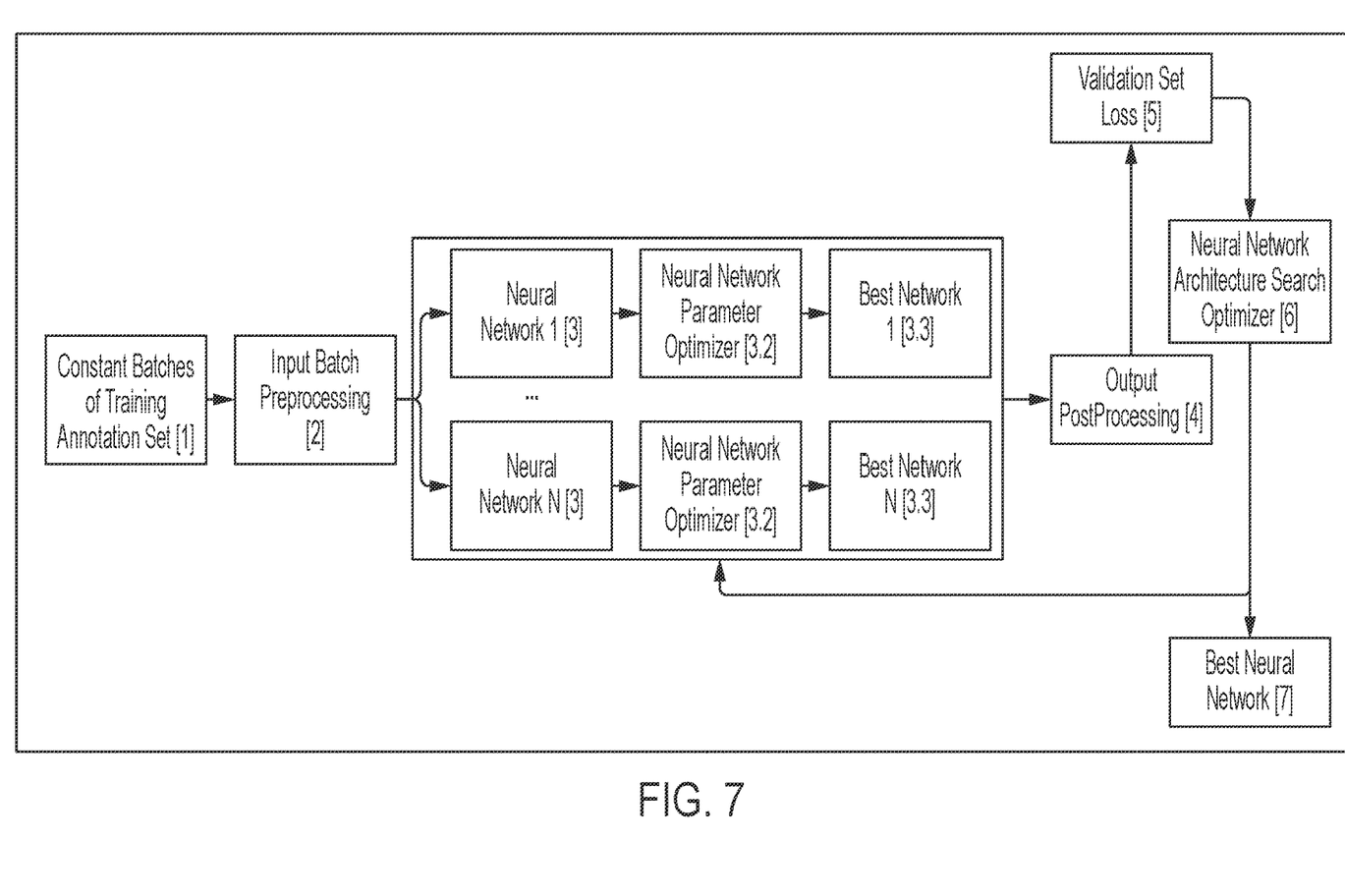
FIG. 7 is a block diagram of a neural network training process.

Once a dataset is available, a data augmentation process may be employed. Referring now to FIG. 7, a training annotation set includes a set of image frames and their corresponding traffic light annotations. The training set may be a constantly evolving set from an initial set of the seed dataset (FIG. 6). The training dataset is sent through a pre-processing pipeline that is responsible for converting the dataset into learned task specific data structures such as learned traffic light/object detector/pose/segmentation data structure that are amenable to neural network training. This preprocessing step may also include, for example, data augmentation, class-wise batch balancing, and other regularization techniques relevant to training vision-based spatio-temporal neural networks. Data augmentation includes, but is not limited to, cutout techniques, mixup techniques, histogram equalization, and other image regularization techniques. In addition, specific class-wise and per-annotation augmentations that enable further regularization may be applied, making the network less susceptible to learning small changes in data. For example, the images are augmented by changing different traffic lights in different images along with changing the bulb structure as well so that the network does not overfit to a particular layout, intersection, or a set of traffic lights. The class-wise batch sampling that helps ensure, for example, that multiple heads, such as the traffic light task head and the object detector task head, are being trained and that the batch contains at least one positive example of each head so that positive gradients are propagated and the activations do not tend to zero. Moreover, each batch may have a specific set of properties from the metadata tags such as GPS location, weather, and time of day. All these activities may include the input batch processing step.

As illustrated in FIG. 7, during the training process, multiple networks may be trained in parallel, represented by Network 1 through N. These networks, for example, represent different deployment and sampling networks. Moreover, this setup may be extended to training deployment networks as some deployment sites lack traffic lights. In such a case, the system may disable the traffic light head during training to speed up training and inference time. With incoming batches, each network may optimized over the training set (i.e., the neural network parameter optimizer), and the best network (i.e., the best network N) is selected. In addition, mixed precision may be used to speed up the training process. Moreover, techniques like quantization aware training may be incorporated to help ensure that node activations fall within a certain range at runtime (i.e., inference).

Once the best network is established over the training set, the parameters of the best network are loaded into a new network and an output processing step is added to the network output. This output processing step is responsible for converting the learned task specific data structure into a digitized task specific data structure similar to a digitized traffic light data structure but extended to other tasks to include, for example, bounding boxes, masks, and cuboids that can be interpreted by downstream processes. Moreover, because different networks can have different learned and digitized outputs, the output post processing of the network are also network and task specific.

A validation dataset, which may not be used during training iterations, may be retained to perform neural architecture search and evaluate neural network architectures against each other. The primary objective to calculate this loss is to understand whether the network architecture is optimal for a given task, including deployment or sampling, and for some fixed constraints, such as inference time or memory usage.

A neural network architecture search optimizer performs neural network architecture search optimization using with the validation dataset loss, the current best architecture, and all the previous architectures and their corresponding losses. The optimizer may be given a set of constraints, such as inference time, latency, memory usage, maximum number of parameters under which the optimization must take place, etc., and, using the constraints, sample from the space of all architectures to generate or output a new architecture for the desired task, such as deployment or sampling. The architecture search may output new architectures for each head (traffic light, object detector etc.) to minimize inference time and maximize the network performance on the validation set. The neural network architecture search process may be continued until an architecture with the desired properties (e.g., meets the constraints) is found. The best neural network with the lowest validation loss and highest performance parameters is selected for being deployed on vehicles.

Figure 8:
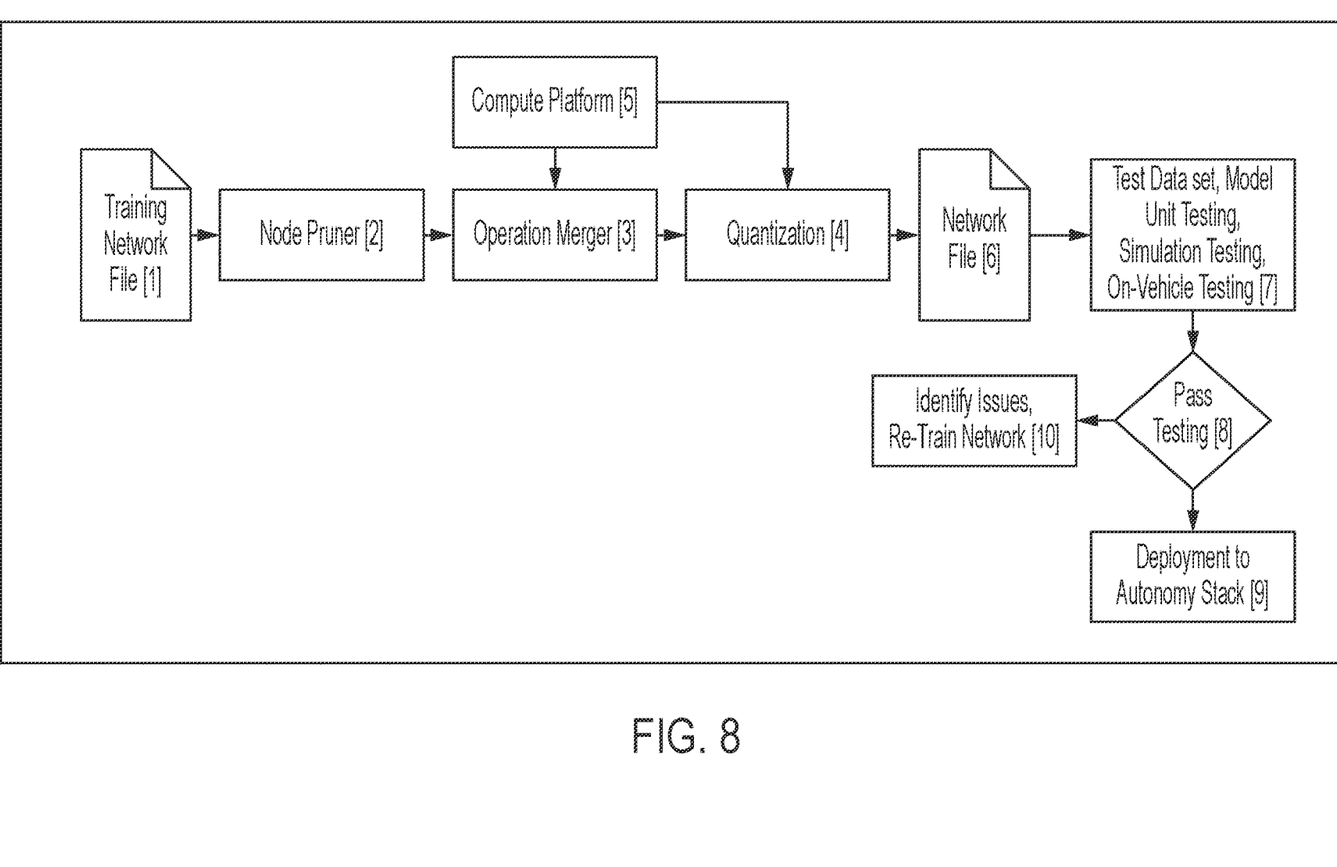
FIG. 8 is a block diagram of a process for deploying a neural network to a vehicle.

The neural network may be further processed and optimized for deployment to be as fast and computationally efficient as possible. This process of generating a neural network for deployment includes quantization, node processing, pruning, and operations merging (FIG. 8). A training neural network file encapsulates the trained deep neural network with the parameters of the neurons and their connections. The file can include millions of such neuron parameters and the connections between them, along with any parameters of the pre and post processing steps. Additionally, some pre/post processing operations that are not part of the neural networks layer may also be used at runtime.

A node pruner may prune one or more nodes. The pruning reduces the number of neurons thus decreasing a total size of the network size, which reduces memory requirements. The pruning step may remove unnecessary computation, nodes, and outputs that are not useful for the particular task. The connections between the neurons, defined as operations herein, in the pruned network are further optimized to extract maximum performance. The neural network operations such as convolution, activation, and batch normalization may be merged into a single operation to increase efficiency. Moreover, specific parameter sizes and layer sizes may be chosen during training to optimize the network in a way to enable maximum efficiency at inference during read and write operation inside, for example, a graphical processing unit (GPU). The merging of the operations may be performed by a compute platform that understands which merges will most increase overall performance on that specific compute platform.

Via a quantization module, the parameters of the network may be converted to a new data format that further reduces the model size, and increases the runtime inference speed without having significant impact to the network performance. In such a case, the network activations may or may not be measured to a specific dataset, and based on the range of the activations, the weights may or may not be quantized to half float, integer types, mixed precision types, or any other data type, or combinations of data types that increases performance on the compute platform. The specific compute platform determines various optimizations that take place on the operations merger and quantization steps.

The quantization module generates an optimized neural network file. The neural network file encapsulates the optimized deep neural network with the parameters of the neurons and their connections. This network may support dynamic inputs (i.e., a network that can process different images of different sizes). The network may be optimized to accept a particular input shape (e.g., type of image) or optimized to accept one or many input shapes dynamically. The operation merging, quantization and node pruning may be done to optimize the network file based on online requirements (e.g., supporting different types of cameras online simultaneously).

The quantized and pruned neural network may be subjected to a rigorous testing process that ensures that the pruning and quantization have not significantly degraded model performance on the target tasks. This ensures that the neural network output of the trained model is consistent with the output of the optimized model. Unit tests on special hard cases may be conducted to ensure that the network still behaves safely and predictably under difficult scenarios. Significant release and regression testing, including on-vehicle testing, simulation testing may be included to ensure safety with the rest of the stack. Based on specific user-defined test criteria, in some examples, the model may be identified as a neural network for deployment. In other examples, various issues are identified with the model that then informs the next iteration of the design and optimization process.

Thus, implementations herein include a system or method for enabling computationally-efficient detection of traffic lights and estimation of states and/or attributes of the detected traffic lights from a stream of images captured by, for example, an exterior viewing camera mounted at a vehicle. The system includes a data structure to store traffic light state that represents traffic light structure (e.g., a concise data structure to encode semantic higher-level information) and a data structure that is amenable to neural network training (e.g., encoded in a format that neural networks can parse and understand such as a binary format enumerated over all possibilities). The system includes a model with a multi-task encoder-decoder architecture. The model may be trained via an iterative training process that continuously improves the network performance. The model may simultaneously engage in various other perceptual tasks ranging from object detection to image segmentation. The model may include a common encoder in the encoder-decoder architecture that can scale to many tasks in an efficient manner. For example, the model includes a common encoder and then multiple decoder "task heads" that each use the common decoder for a specific task (e.g., traffic light detection, weather detection, headlight detection, etc.). The model may be iteratively improved via sampling examples from vehicles deployed worldwide. The model is capable of understanding a scene from a stream of images including but not limited to object detection, traffic light detection and estimation, image segmentation, and any other perceptual task.

For autonomous vehicles suitable for deployment with the system, an occupant of the vehicle may, under particular circumstances, be desired or required to take over operation/control of the vehicle and drive the vehicle so as to avoid potential hazard for as long as the autonomous system relinquishes such control or driving. Such an occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least 1 million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687;

9,900,490; 9,126,525 and/or 9,036,026, which are hereby incorporated herein by reference in their entireties.

The system may utilize sensors, such as radar sensors or imaging radar sensors or lidar sensors or the like, to detect presence of and/or range to other vehicles and objects at the intersection. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, the vehicular control system comprising:
   a camera disposed at a vehicle equipped with the vehicular control system and viewing exterior of the equipped vehicle, the camera capturing image data;
   wherein the camera comprises a CMOS imaging array, and wherein the CMOS imaging array comprises at least one million photosensors arranged in rows and columns;
   an electronic control unit (ECU) comprising electronic circuitry and associated software;
   wherein the electronic circuitry of the ECU comprises an image processor for processing image data captured by the camera;
   wherein the vehicular control system, responsive to processing by the image processor of image data captured by the camera, detects a traffic light at an intersection ahead of the equipped vehicle that controls traffic traveling along a road being traveled by the equipped vehicle, and wherein the detected traffic light is operable to generate a plurality of traffic signals, and wherein each traffic signal comprises a visual indication for controlling traffic;
   wherein the vehicular control system comprises a neural network, and wherein, based at least in part on detection of the traffic light in front of the equipped vehicle, the neural network generates a learned traffic light data structure, and wherein the learned traffic light data structure is a representation of each traffic signal of the traffic light using at least one two-dimensional matrix;
   wherein the vehicular control system, responsive to the neural network generating the learned traffic light data structure, converts the learned traffic light data structure into a digitized traffic light data structure for downstream communications, and wherein the digitized traffic light data structure comprises at least one attribute of each traffic signal of the traffic light; and
   wherein the vehicular control system communicates the digitized traffic light data structure to an autonomous control feature of the equipped vehicle, and wherein the autonomous control feature, responsive to receiving the communicated digitized traffic light data structure, autonomously controls at least one selected from the group consisting of (i) acceleration of the equipped vehicle, (ii) braking of the equipped vehicle and (iii) steering of the equipped vehicle.

2. The vehicular control system of claim 1, wherein the at least one attribute of each traffic signal of the traffic light comprises at least one selected from the group consisting of (i) a color of the traffic signal, (ii) a shape of the traffic signal, (iii) a position of the traffic signal, and (iv) a state of the traffic signal.

3. The vehicular control system of claim 2, wherein the state of the traffic signal comprises one selected from the group consisting of (i) solidly off, (ii) solidly on, and (iii) blinking.

4. The vehicular control system of claim 1, wherein the at least one attribute of each traffic signal of the traffic light comprises at least a position of the detected traffic light.

5. The vehicular control system of claim 1, wherein the at least one attribute of each traffic signal of the traffic light comprises at least an orientation of the detected traffic light.

6. The vehicular control system of claim 1, wherein the at least one attribute of each traffic signal of the traffic light comprises at least a layout of the traffic light.

7. The vehicular control system of claim 1, wherein the at least one attribute of each traffic signal of the traffic light comprises at least a type of the traffic light.

8. The vehicular control system of claim 1, wherein the at least one attribute of each traffic signal of the traffic light comprises a color of the traffic signal.

9. The vehicular control system of claim 8, wherein the color comprises one selected from the group consisting of (i) red, (ii) amber, (iii) and green.

10. The vehicular control system of claim 1, wherein the at least one attribute of each traffic signal of the traffic light comprises an illuminated arrow permitting traffic on the road being traveled by the equipped vehicle to turn at the intersection.

11. The vehicular control system of claim 1, wherein the neural network is trained using sample learned traffic light data structures.

12. The vehicular control system of claim 11, wherein the learned traffic light data structure comprises a plurality of two-dimensional matrices.

13. The vehicular control system of claim 12, wherein the learned traffic light data structure comprises each of the plurality of two-dimensional matrices concatenated together.

14. The vehicular control system of claim 12, wherein each cell of a first two-dimensional matrix of the plurality of two-dimensional matrices represents a relative location of one of the plurality of traffic signals of the detected traffic light.

15. The vehicular control system of claim 14, wherein each attribute of the at least one attribute corresponds to a different one of the plurality of two-dimensional matrices.

16. The vehicular control system of claim 14, wherein the learned traffic light data structure comprises each of the plurality of two-dimensional matrices concatenated together.

17. The vehicular control system of claim 1, wherein the neural network comprises an encoder-decoder neural network.

18. The vehicular control system of claim 17, wherein the encoder-decoder neural network comprises a common encoder for a plurality of decoder task heads, and wherein the plurality of decoder task heads comprises a traffic light detection task head.

19. The vehicular control system of claim 18, wherein the plurality of decoder task heads comprises a weather detection task head.

20. The vehicular control system of claim 18, wherein the plurality of decoder task heads comprises an object detection task head.

21. The vehicular control system of claim 20, wherein the plurality of decoder task heads comprises a weather detection task head.

22. The vehicular control system of claim 18, wherein the plurality of decoder task heads comprises an image segmentation task head.

23. The vehicular control system of claim 22, wherein the plurality of decoder task heads comprises a weather detection task head.

24. The vehicular control system of claim 18, wherein the plurality of decoder task heads comprises a pose estimation task head.

25. The vehicular control system of claim 24, wherein the plurality of decoder task heads comprises a weather detection task head.

26. The vehicular control system of claim 18, wherein the plurality of decoder task heads comprises a cuboid detection task head.

27. The vehicular control system of claim 26, wherein the plurality of decoder task heads comprises a weather detection task head.

28. The vehicular control system of claim 18, wherein each decoder task head of the plurality of decoder task heads generates a trainable heatmap representation.

29. The vehicular control system of claim 18, wherein the traffic light detection task head comprises at least one sub-head.

30. The vehicular control system of claim 18, wherein the encoder-decoder neural network comprises a classification task head that classifies a frame of image data derived from the image data captured by the camera.

31. The vehicular control system of claim 17, wherein the encoder-decoder neural network comprises at least one temporal module that aggregates features over time.

32. The vehicular control system of claim 1 wherein the neural network is trained on a training dataset comprising a plurality of annotated frames of image data.

33. The vehicular control system of claim 32, wherein the neural network is evaluated using a validation dataset that is not a part of the training dataset.

34. The vehicular control system of claim 32, wherein the training dataset is generated by a sampling neural network.

35. The vehicular control system of claim 34, wherein the neural network is evaluated using a validation dataset that is not a part of the training dataset.

36. The vehicular control system of claim 32, wherein the training dataset is augmented using at least one selected from the group consisting of (i) cutout techniques, (ii) mixup techniques, and (iii) histogram equalization.

37. The vehicular control system of claim 36, wherein the neural network is evaluated using a validation dataset that is not a part of the training dataset.

38. The vehicular control system of claim 32, wherein the plurality of annotated frames of image data are derived from image data captured by other vehicular cameras.

39. The vehicular control system of claim 38, wherein the neural network is evaluated using a validation dataset that is not a part of the training dataset.

40. The vehicular control system of claim 1, wherein the neural network is trained using a final total loss, and wherein the final total loss comprises an aggregation of loss from each of a plurality of decoder task heads.

41. The vehicular control system of claim 1, wherein the vehicular control system stores the digitized traffic light data structure at non-volatile memory disposed at the equipped vehicle.

42. A vehicular control system, the vehicular control system comprising:
a camera disposed at a vehicle equipped with the vehicular control system and viewing exterior of the equipped vehicle, the camera capturing image data;
wherein the camera comprises a CMOS imaging array, and wherein the CMOS imaging array comprises at least one million photosensors arranged in rows and columns;
an electronic control unit (ECU) comprising electronic circuitry and associated software;
wherein the electronic circuitry of the ECU comprises an image processor for processing image data captured by the camera;
wherein the vehicular control system, responsive to processing by the image processor of image data captured by the camera, detects a traffic light at an intersection ahead of the equipped vehicle that controls traffic traveling along a road being traveled by the equipped vehicle, and wherein the detected traffic light is operable to generate a plurality of traffic signals, and wherein each traffic signal comprises a visual indication for controlling traffic;
wherein the vehicular control system comprises a neural network, and wherein the neural network is trained using sample learned traffic light data structures, and wherein, based at least in part on detection of the traffic light in front of the equipped vehicle, the neural network generates a learned traffic light data structure, and wherein the learned traffic light data structure is a representation of each traffic signal of the traffic light using at least one two-dimensional matrix;
wherein the vehicular control system, responsive to the neural network generating the learned traffic light data structure, converts the learned traffic light data structure into a digitized traffic light data structure for downstream communications, and wherein the digitized traffic light data structure comprises at least one attribute of each traffic signal of the traffic light, and wherein the at least one attribute of each traffic signal of the traffic light comprises at least one selected from the group consisting of (i) a color of the traffic signal, (ii) a shape of the traffic signal, (iii) a position of the traffic signal, and (iv) a state of the traffic signal; and
wherein the vehicular control system communicates the digitized traffic light data structure to an autonomous control feature of the equipped vehicle, and wherein the autonomous control feature, responsive to receiving the communicated digitized traffic light data structure, autonomously controls at least one selected from the group consisting of (i) acceleration of the equipped vehicle, (ii) braking of the equipped vehicle and (iii) steering of the equipped vehicle.

43. The vehicular control system of claim 42, wherein the state of the traffic signal comprises one selected from the group consisting of (i) solidly off, (ii) solidly on, and (iii) blinking.

44. The vehicular control system of claim 42, wherein the learned traffic light data structure comprises a plurality of two-dimensional matrices.

45. The vehicular control system of claim 44, wherein the learned traffic light data structure comprises each of the plurality of two-dimensional matrices concatenated together.

46. A vehicular control system, the vehicular control system comprising:

a camera disposed at a vehicle equipped with the vehicular control system and viewing exterior of the equipped vehicle, the camera capturing image data;

wherein the camera comprises a CMOS imaging array, and wherein the CMOS imaging array comprises at least one million photosensors arranged in rows and columns;

an electronic control unit (ECU) comprising electronic circuitry and associated software;

wherein the electronic circuitry of the ECU comprises an image processor for processing image data captured by the camera;

wherein the vehicular control system, responsive to processing by the image processor of image data captured by the camera, detects a traffic light at an intersection ahead of the equipped vehicle that controls traffic traveling along a road being traveled by the equipped vehicle, and wherein the detected traffic light is operable to generate a plurality of traffic signals, and wherein each traffic signal comprises a visual indication for controlling traffic;

wherein the vehicular control system comprises a neural network, and wherein, based at least in part on detection of the traffic light in front of the equipped vehicle, the neural network generates a learned traffic light data structure, and wherein the learned traffic light data structure is a representation of each traffic signal of the traffic light using at least one two-dimensional matrix;

wherein the neural network comprises an encoder-decoder neural network, and wherein the encoder-decoder neural network comprises a common encoder for a plurality of decoder task heads, and wherein the plurality of decoder task heads comprises a traffic light detection task head, and wherein the encoder-decoder neural network comprises at least one temporal module that aggregates features over time;

wherein the vehicular control system, responsive to the neural network generating the learned traffic light data structure, converts the learned traffic light data structure into a digitized traffic light data structure for downstream communications, and wherein the digitized traffic light data structure comprises at least one attribute of each traffic signal of the traffic light; and wherein the vehicular control system communicates the digitized traffic light data structure to an autonomous control feature of the equipped vehicle, and wherein the autonomous control feature, responsive to receiving the communicated digitized traffic light data structure, autonomously controls at least one selected from the group consisting of (i) acceleration of the equipped vehicle, (ii) braking of the equipped vehicle and steering of the equipped vehicle.

47. The vehicular control system of claim 46, wherein the plurality of decoder task heads comprises a weather detection task head.

48. The vehicular control system of claim 46, wherein the plurality of decoder task heads comprises an object detection task head.

* * * * *

UNITED STATES PATENT AND TRADEMARK OFFICE
CERTIFICATE OF CORRECTION

| | | |
|---|---|---|
| PATENT NO. | : 12,391,275 B2 | Page 1 of 1 |
| APPLICATION NO. | : 18/560478 | |
| DATED | : August 19, 2025 | |
| INVENTOR(S) | : Kushagra Tiwary et al. | |

It is certified that error appears in the above-identified patent and that said Letters Patent is hereby corrected as shown below:

In the Specification

<u>Column 1</u>
Line 5, "APPLICATIONS APPLICATION" should be --APPLICATION--

In the Claims

<u>Column 15</u>
Line 44, Claim 32, "of claim 1" should be --of claim 1,--

<u>Column 18</u>
Lines 26-27, Claim 46, "and steering" should be --and (iii) steering--

Signed and Sealed this
Thirtieth Day of September, 2025

John A. Squires
*Director of the United States Patent and Trademark Office*